Figure 1:
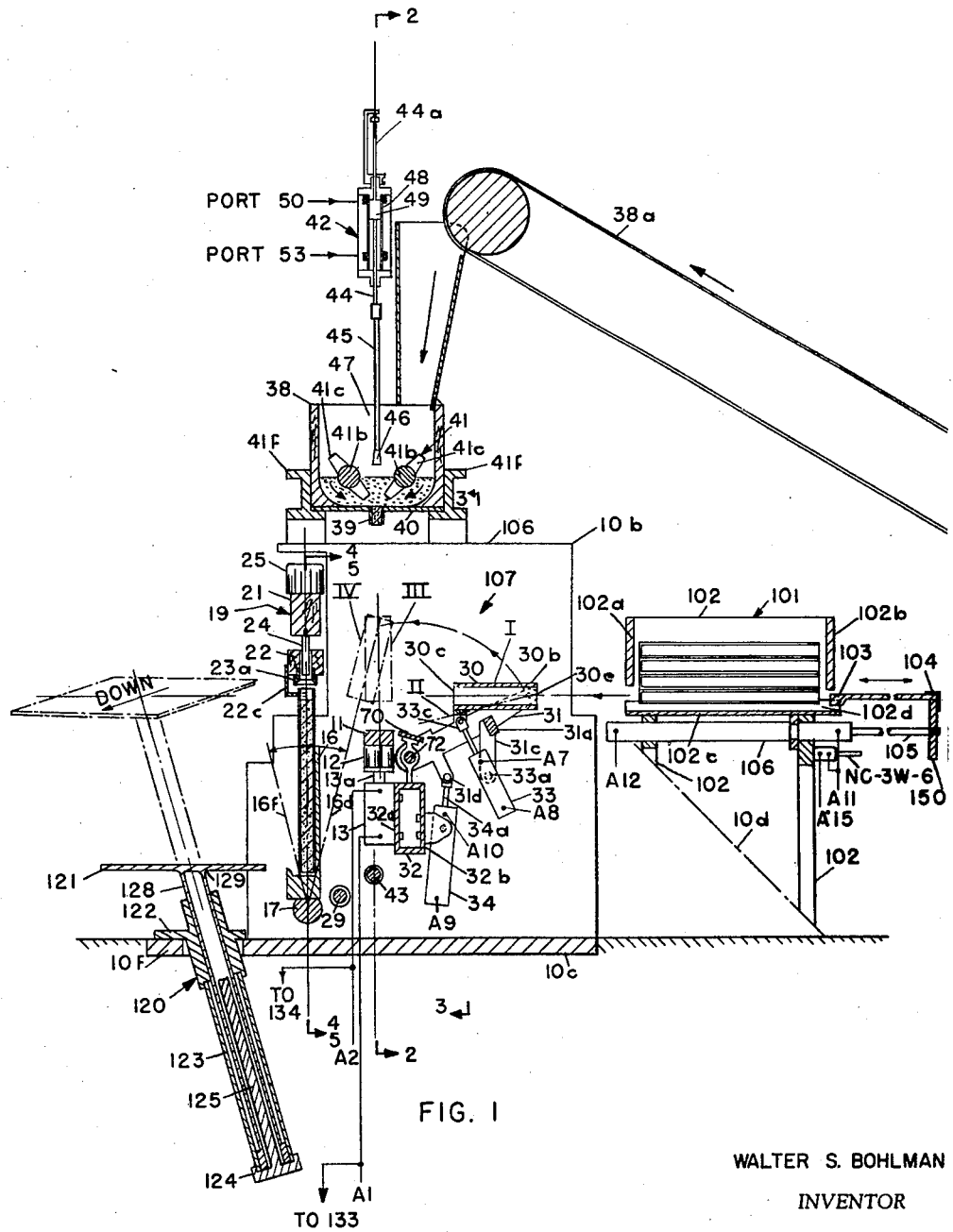

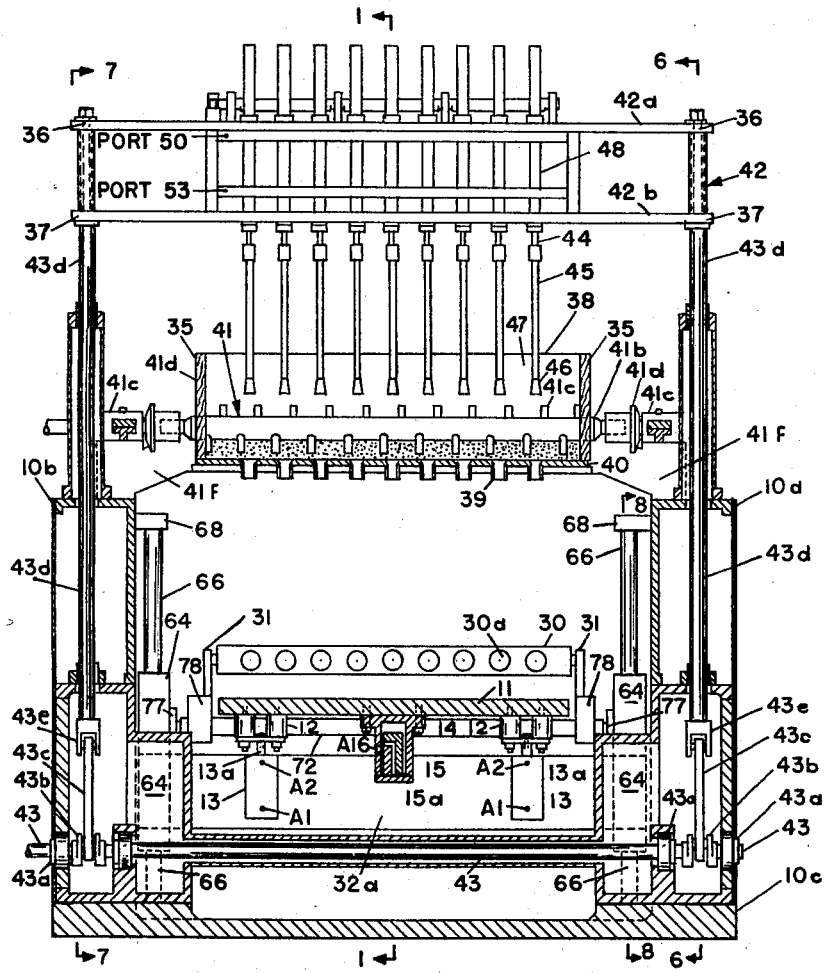
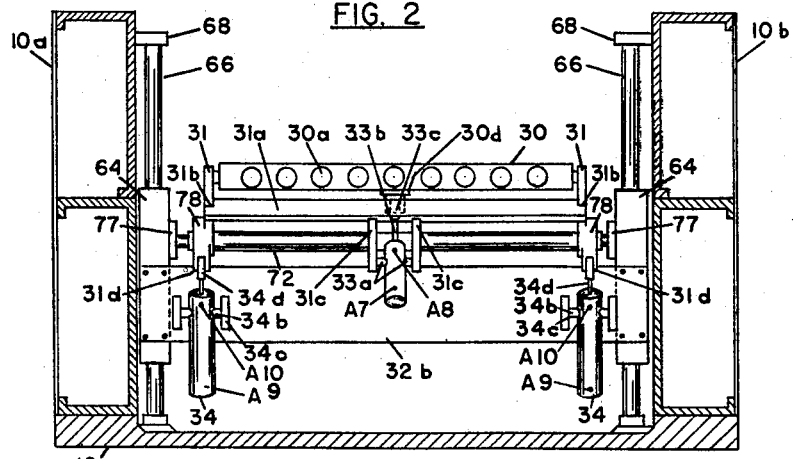
FIG. 2
FIG. 3
WALTER S. BOHLMAN
INVENTOR

Sept. 29, 1959 W. S. BOHLMAN 2,906,073
DISCHARGE TABLE ASSEMBLY FOR PACKER
Filed May 21, 1958 9 Sheets-Sheet 3
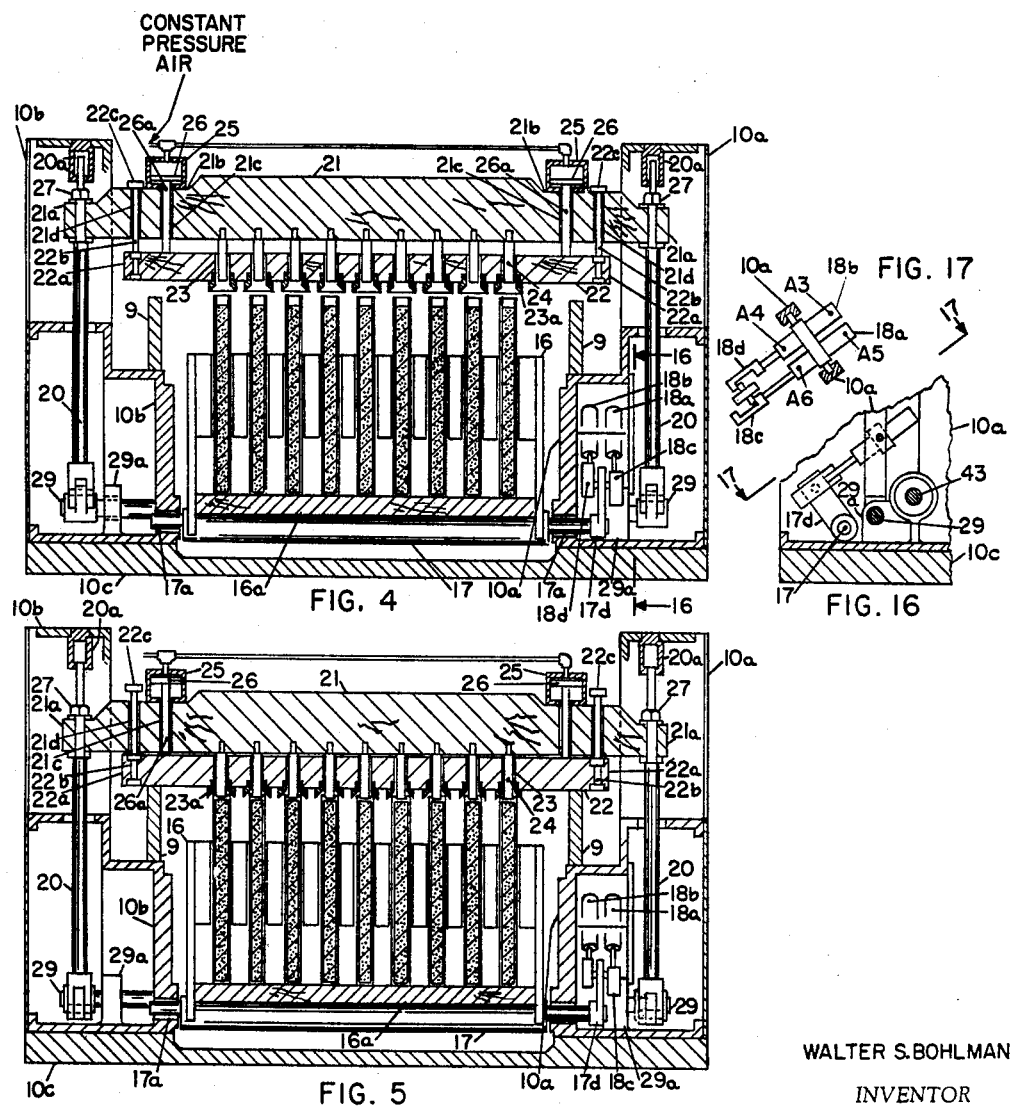
WALTER S. BOHLMAN
INVENTOR
BY Ernest G. Peterson
AGENT.

Sept. 29, 1959  W. S. BOHLMAN  2,906,073
DISCHARGE TABLE ASSEMBLY FOR PACKER
Filed May 21, 1958  9 Sheets-Sheet 4

WALTER S. BOHLMAN
INVENTOR

BY Ernest G. Peterson
AGENT.

Sept. 29, 1959     W. S. BOHLMAN     2,906,073
DISCHARGE TABLE ASSEMBLY FOR PACKER
Filed May 21, 1958     9 Sheets-Sheet 5

WALTER S. BOHLMAN
*INVENTOR*

BY Ernest G. Peterson
AGENT.

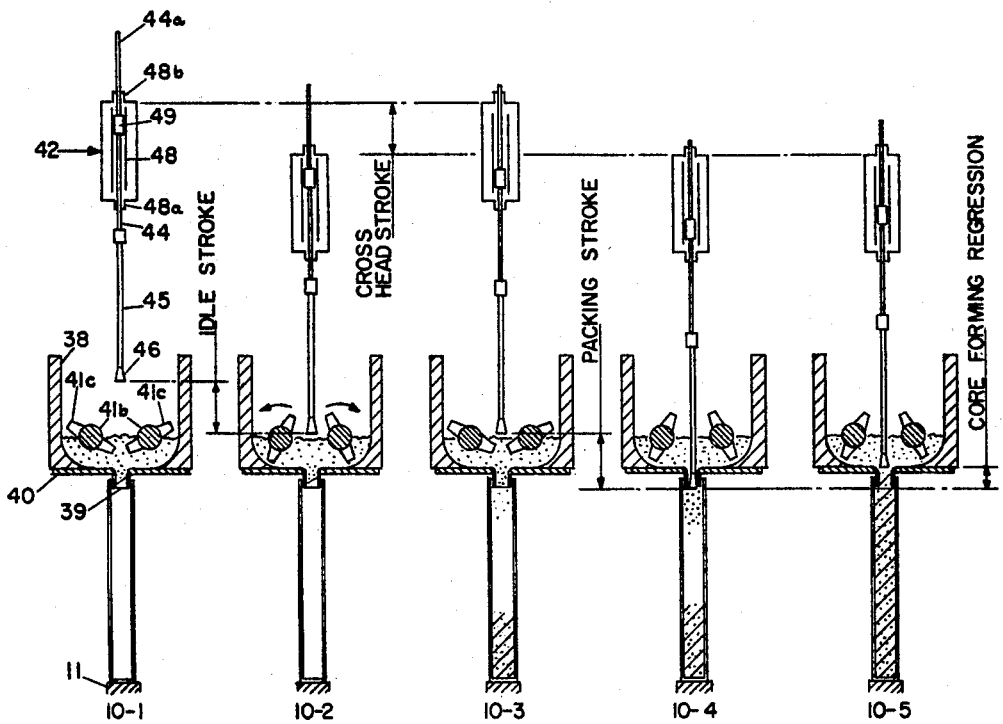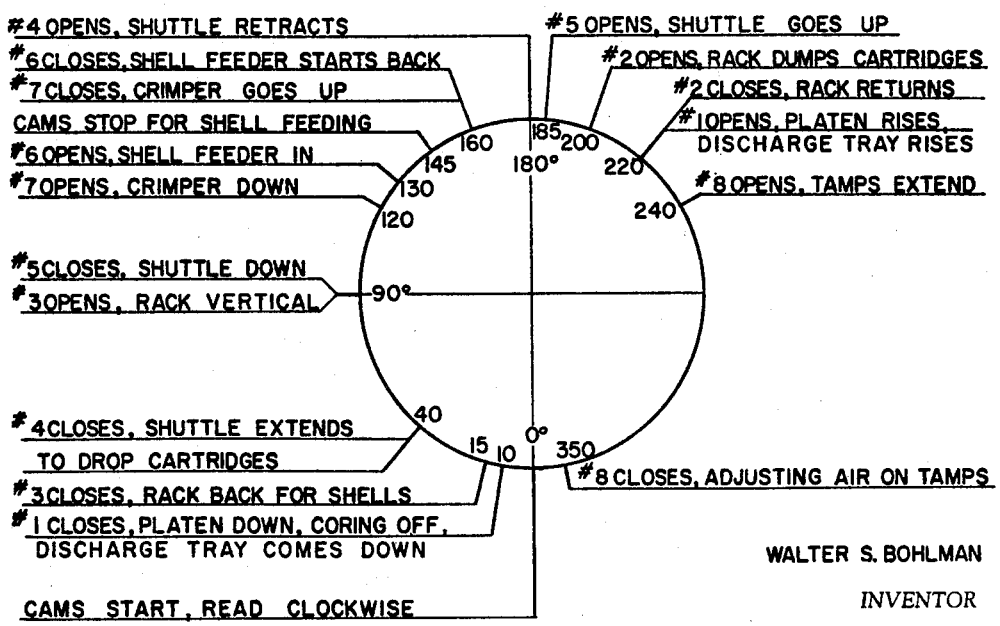

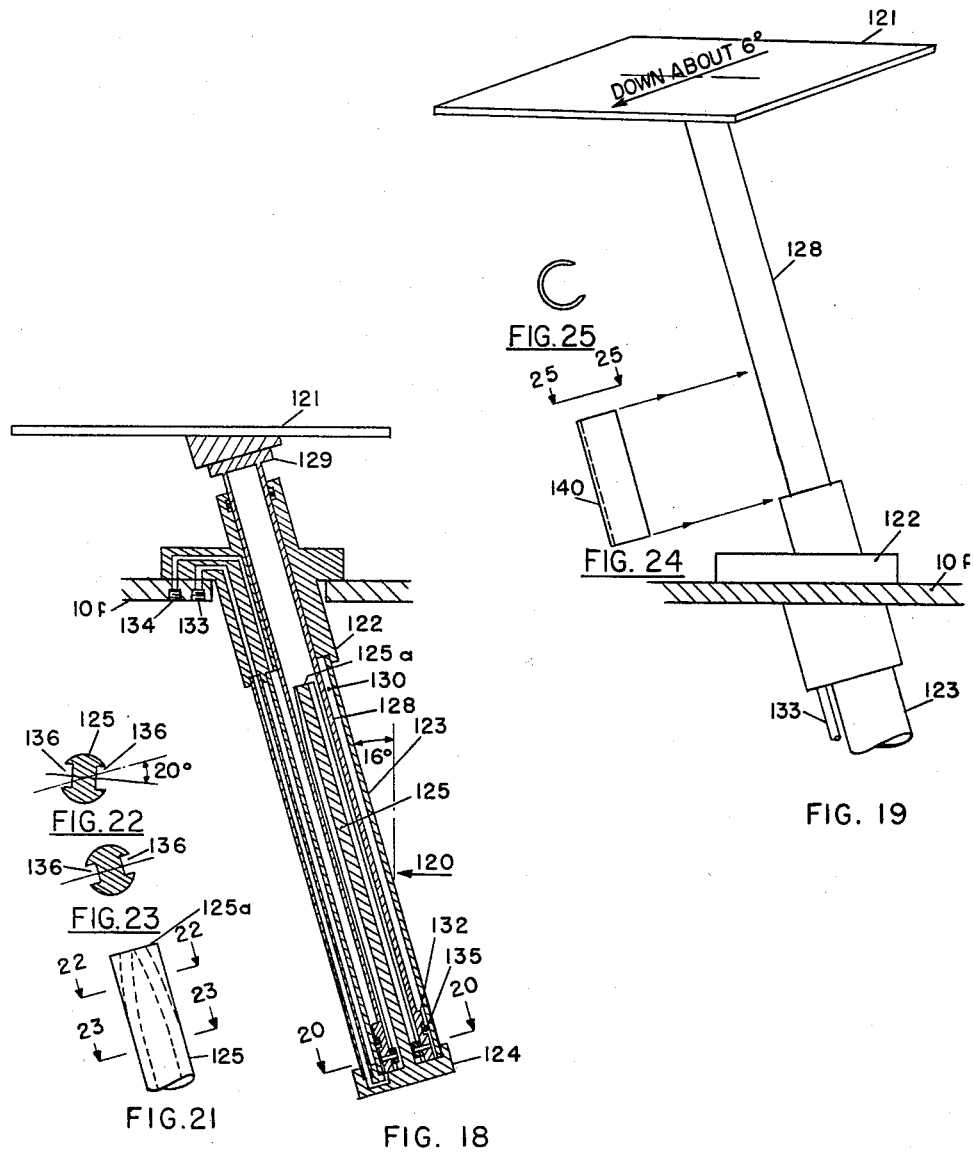

Sept. 29, 1959 W. S. BOHLMAN 2,906,073
DISCHARGE TABLE ASSEMBLY FOR PACKER
Filed May 21, 1958 9 Sheets-Sheet 9

WALTER S. BOHLMAN
INVENTOR

BY Ernest G. Peterson
AGENT.

2,906,073
Patented Sept. 29, 1959

2,906,073

DISCHARGE TABLE ASSEMBLY FOR PACKER

Walter S. Bohlman, Wilmington, Del., assignor to Hercules Powder Company, Wilmington, Del., a corporation of Delaware Application May 21, 1958, Serial No. 736,776

11 Claims. (Cl. 53—126)

This invention relates to an improved tamp type packer assembly particularly advantageously applied to the packing of explosives. In one aspect this invention relates to a table assembly adapted to receive materials and then deliver same for further handling. In another aspect this invention relates to a discharge table device attached to a shaft at an acute angle therewith and adapted to be horizontally disposed for a duration requisite for loading with a material and thereafter to be tilted for discharge of the said material by revolution of the shaft to a predetermined degree. In another aspect this invention relates to a tamp type packer machine, for producing finished explosive cartridges, in combination with a discharge tray assembly, wherein action of the said tray assembly is synchronized with packing action of the machine to provide an overall automatic operation for packing the cartridge shells, including closure thereof, and for receiving the finished cartridges from the machine and delivering them for further handling.

In the packaging and sale of many commodities it is generally highly desirable to pack containers with the desired material to a uniform density. This is of particular importance in the packing of explosive cartridges since the results obtained in blasting operations are often directly dependent upon the uniformity of packing density of the explosive material.

For many years the standard dynamite cartridge has been in the order of about a 1¼ inch x 8 inch stick, although in recent years cartridges of increased diameter and length, e.g., up to 8 inches x 24 inches, have been commonplace. The well known Hall machine, which functions by the tamping of the explosive material into the cartridge shell, has been satisfactory for packing the smaller of the above cartridge sizes. The larger of those cartridges can be expeditiously packed by vibration of the shell during packing in accordance with the disclosure of the now abandoned application Serial No. 134,530 filed December 22, 1949.

More recently, cartridges of still smaller diameter and greater length than those above referred to, e.g., 1¼ to 2 inches in diameter by 12 to 24 inches in length, have found wide use. The Hall machine has not been successfully adapted to packing these longer and smaller bore cartridge shells. Neither has it been possible to pack these shells employing prior vibratory techniques, the difficulty apparently having been in the problem of accomplishing uniformity of feeding.

However, in the copending application of Walter S. Bohlman and Jack D. Hayes, Jr., Serial No. 736,860 filed May 21, 1958, which is a continuation-in-part of copending application Serial No. 346,206 filed April 5, 1953, the latter a continuation-in-part of now abandoned application Serial No. 134,530 filed December 22, 1949, there is disclosed and claimed a packer which uniformly feeds such long small bore cartridge shells while maintaining them in a state of vibration. The machine forces explosive materials through nipples and gravitates them into separate shell containers, the latter meanwhile being maintained in a state of vibration to consolidate the explosive material to a uniformly packed density. The machine then moves the containers to a crimping station to be crimp-closed.

Heretofore in the packing of containers employing a packer machine such as that of the two above referred to copending applications, or a machine of the Hall type, it has been necessary that the container subsequent to closure of same be received and conveyed manually from the machine. This has required that an operator synchronize his actions with those of the machine in order to continue the cycle without interference by an accumulation of finished closed containers at the crimping station.

This invention is particularly concerned with apparatus whereby packaged containers can be continuously and automatically received from a packing machine and delivered for further handling, whereby need for manual operation of the prior art for handling of such finished containers is eliminated.

An object of the invention is to provide a table assembly for receiving and then delivering materials for further handling. Another object is to provide apparatus for automatically handling explosive cartridges in lieu of manual operation that has been necessary heretofore. Another object is to provide apparatus for effecting automatic operation for filling and packing containers, including closure of same, and for receiving the finished containers and delivery of same for further handling. Another object is to provide a tamp-type packer machine in combination with a table assembly adapted to receive finished cartridges from the machine and deliver them for further handling. Other objects and aspects will be apparent from the accompanying disclosure and the appended claims.

In accordance with the invention apparatus is provided for receiving materials and then delivering same for further handling, which comprises a shaft adapted to be moved axially, and means for axially moving said shaft a predetermined distance; support means for said shaft; a table rigidly supported at one end of said shaft at an acute angle therewith; and means associated with said shaft for guiding same in a state of rotation throughout at least a portion of its travel when axially moved.

The table assembly of the invention in a now preferred form comprises an elongated cylindrical fluid tight housing containing a guide rod generally secured to the inner wall of a first end of the housing and longitudinally disposed therein to form an annulus with the inner cylindrical housing wall. A hollow shaft extends longitudinally into and through a second and opposite end of the said housing in concentric relation with the guide rod.

A piston is transversely disposed in the housing, fluid tight with the inner wall of said housing and with the end of the hollow shaft therein, and is rigidly secured to the end of the hollow shaft.

The piston is keyed to grooves in the guide shaft which extend, in a direction toward the second housing end, initially parallel with the axis of the guide rod and then follow a curved path.

A table is rigidly supported on the end of the hollow shaft at an acute angle therewith, outside the housing, and also serves as a closure, at that end, for the hollow shaft. The hollow shaft is axially movable through the second housing end.

Suitable conduit means is provided for leading fluid pressure, generally air, to a point in the housing below the piston to raise it to impart axial upward movement to the piston and shaft. At this point the table is disposed substantially horizontally and remains so as the piston moves along the straight grooves. However, as the rising piston encounters and follows the curved grooves, the shaft is caused thereby to rotate and in so doing causes the table to tip which permits the material loaded thereon to gravitate from the table into a suitable receptacle for further handling.

Suitable conduit means is provided for venting fluid pressure from below the piston when at its uppermost point of travel to permit its reverse travel just along the curved path to return the table to its horizontal position and then along the straight path to lower the table to its predetermined lower vertical level as determined by the lowermost point of travel of the piston. Suitable conduit means is provided for venting fluid from the housing above the piston during its upward travel and to admit fluid, when necessary, to aid in the downward travel of the table.

Although a housing support for the table and shaft assembly is now preferred and fluid pressure together with the guide rods and grooves, as above described, are advantageously employed for moving the table and hollow shaft axially and in rotation for at least a portion of the travel, any suitable mechanical means can be utilized in lieu of these elements, as desired.

The guide grooves, in the practice of the above-described preferred embodiment, can be curved along the entire length of the guide rod, dependent on their pitch and the length of the rod. Thus, a guide rod sufficiently short with all grooves curved provides for adequate tipping of the table through a short length of axial travel of the hollow shaft.

Although the preferred apparatus utilizes grooves in the guide rod which are initially straight and then curved, in the direction of upward travel, the succession of straight and curved grooves can be reversed to provide for loading the table for tipping in its lowermost position with concomitant discharge of materials at a point lower than that of the loading.

Figure 7:
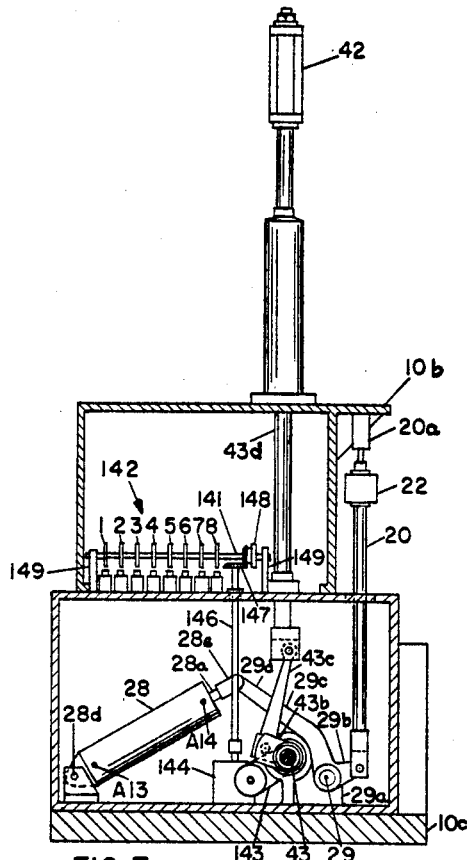
Figure 6:
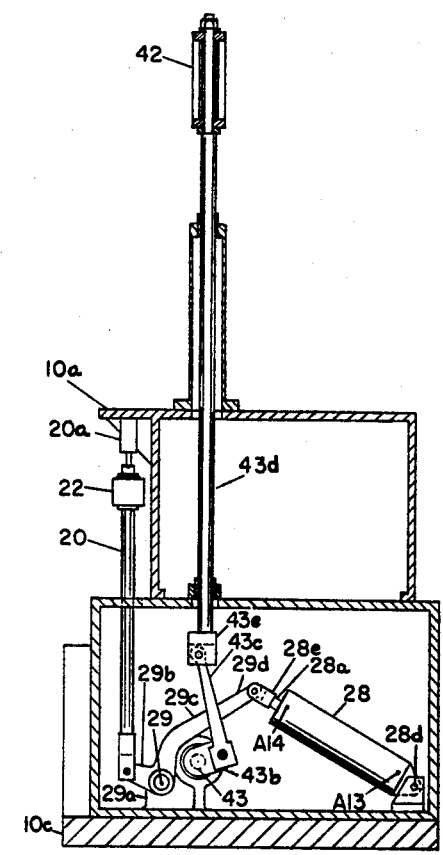
Figure 8:
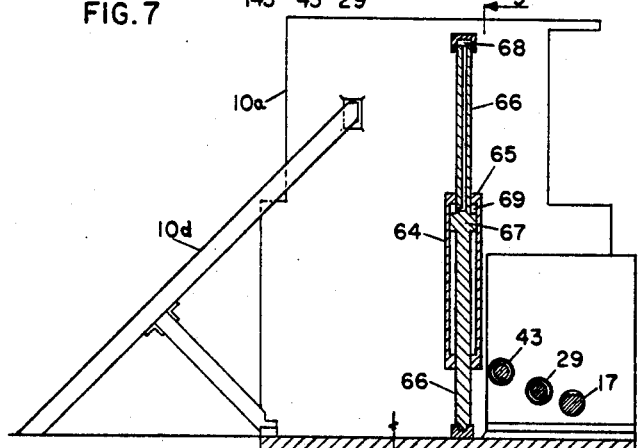
Figure 9:
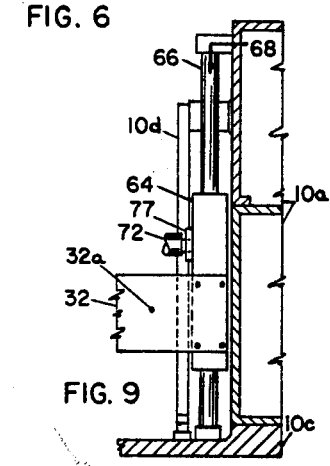
Figure 12:
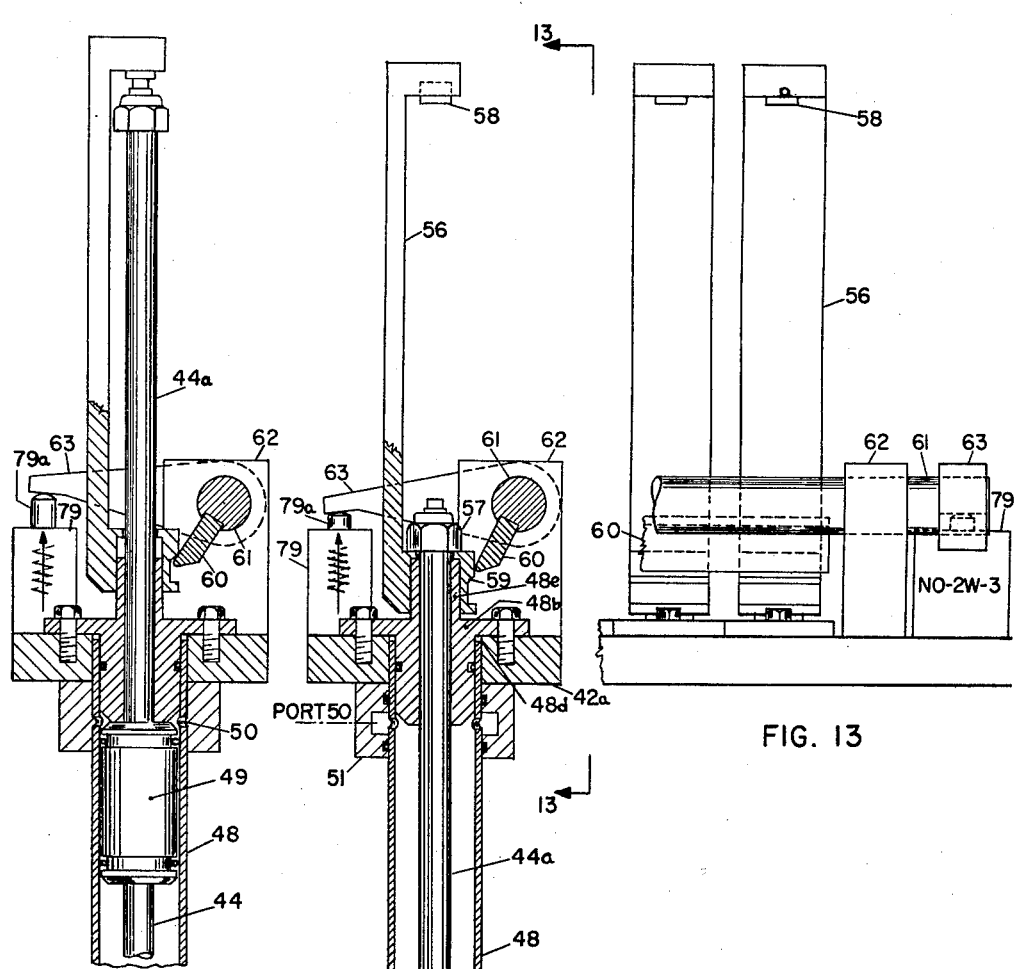
Figure 11:
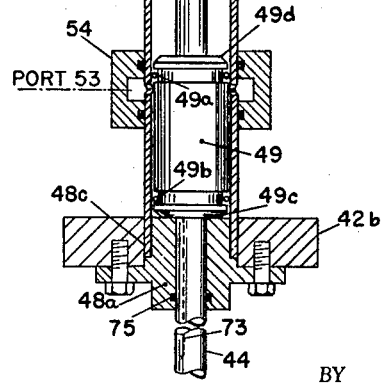
Figure 14:
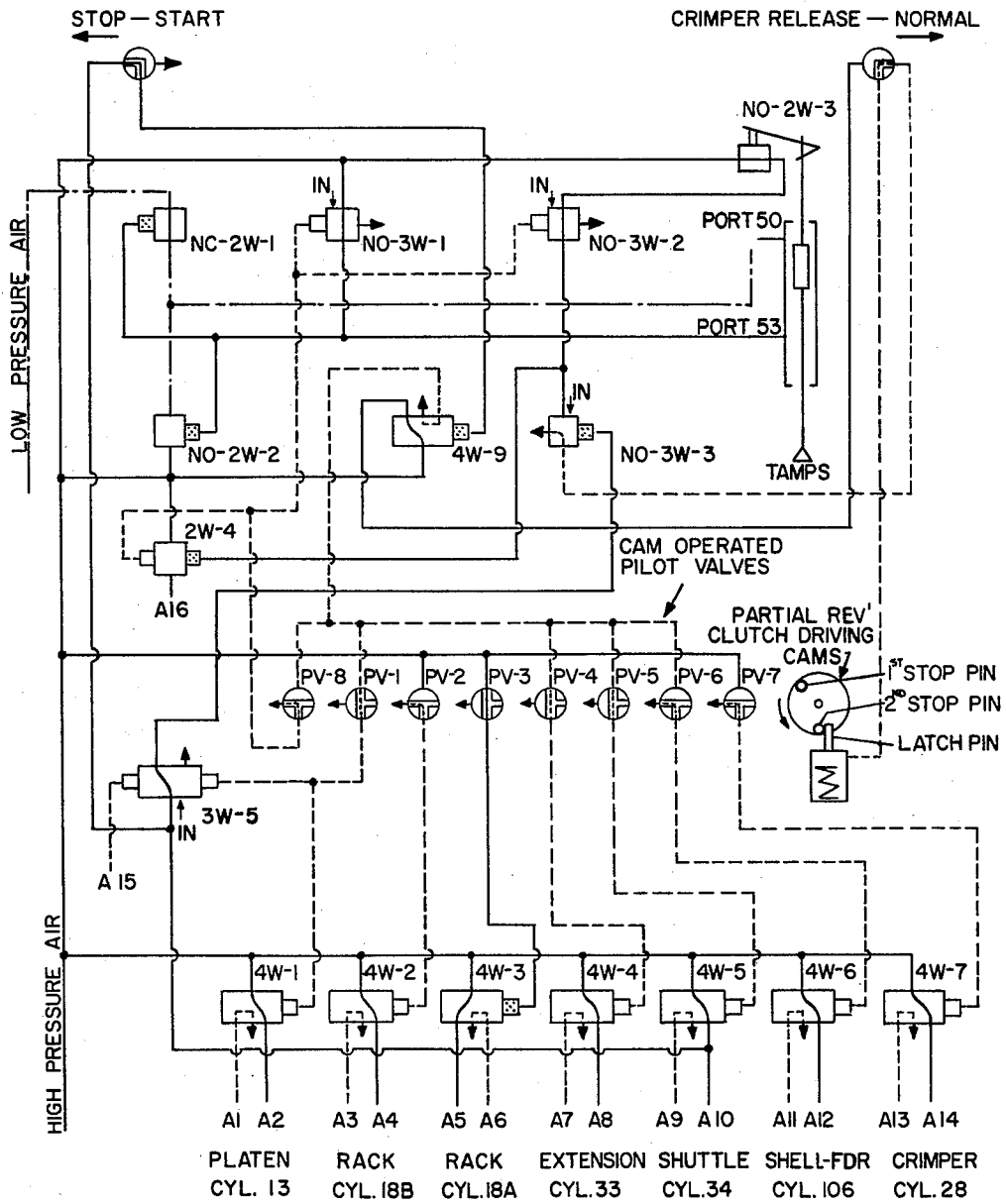
Figure 26:
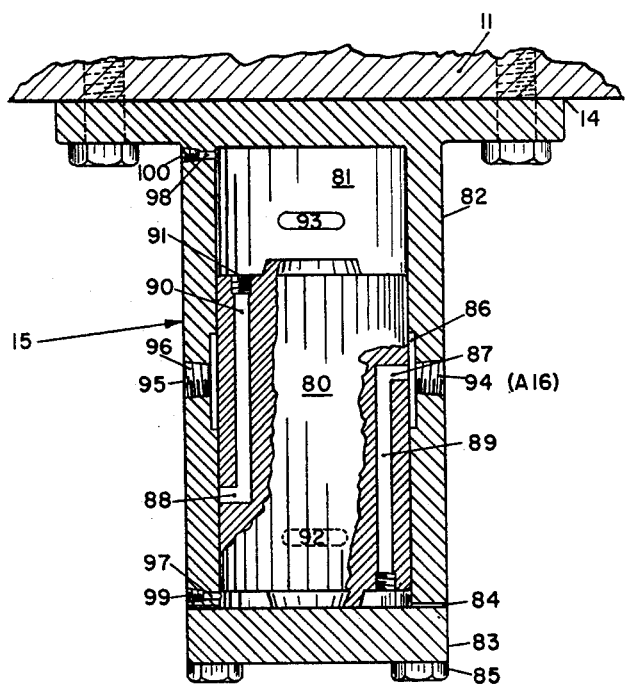

The apparatus of the invention is advantageously applied to receiving and delivery of elongated finished packages produced by a packer machine of the above said copending applications. The said packing machine coordinated with a preferred form of table assembly of this invention to provide for an overall automatic operation involving packing, crimping and discharge of finished units for further handling is illustrated with reference to Figures 1–26 of the drawings of which Figure 1 is a cross-sectional view of a packer machine of the invention taken on the longitudinal center line; Figure 2 is a sectional elevation from the front of the machine of Figure 1 taken on the line 2—2 of Figure 1; Figure 3 is a partial sectional elevation of the machine, from the rear, taken on the line 3—3 of Figure 1, showing parts of the central structure obscured in Figure 2; Figure 4 is a front sectional elevation of the machine taken along the line 4—4 of Figure 1 showing crimp-closing structure, including packed containers in position to be crimp-closed; Figure 5 is a front sectional elevation of the machine taken along the line 5—5 of Figure 1 except that it shows packed containers in position after the completion of the crimp closure; Figure 6 is a cross-sectional side view taken along the line 6—6 of Figure 2 showing various elements obscured in Figure 1; Figure 7 is a cross-sectional side view of the machine opposite that of Figure 6 taken along the line 7—7 of Figure 2, also showing parts obscured in Figure 1 but being particularly illustrative of a timing mechanism for operating the elements of the machine in the necessary sequence; Figure 8 is a sectional elevation of an elevator assembly taken along the line 8—8 of Figure 2, which in conjunction with another like unit functions to raise and lower the central structure of Figure 2; Figure 9 is a partial elevation taken along the line 9—9 of Figure 8, further illustrative of the structure of Figure 8 and its function; Figure 10 is a series of cross-sections showing relative positions of tamping and stirring devices of Figures 1 and 2 during various stages of the packing cycle; Figure 11 is a cross-sectional view of a single tamp cylinder unit, illustrative of the plurality of cylinder assemblies of Figures 1 and 2; Figure 12 is the same as Figure 11 except that it shows the piston of Figure 11 and associated parts in retracted or idling position; Figure 13 is a partial elevation along the line 13—13 of Figure 11 illustrative of a trip valve assembly, including element 60, of Figure 11 as a bar across the rear of the crosshead 42 for operation by the plurality of cylinder assemblies of Figures 1 and 2; Figure 14 is a line diagram of a pneumatic control system for operating the machine through its cycle; Figure 15 is a 360° sequence chart of the pilot valve operation (cam system of Figure 7) illustrative of the cycle that results with each complete revolution of the cam unit; Figure 16 is a partial elevation along the line 16—16 of Figure 4 illustrative of an air cylinder structure for operating the crimper rack in association with the crimp-closing mechanism of Figures 4 and 5; Figure 17 is a partial plan view taken on the angular line 17—17 of Figure 16; Figure 18 is a detailed section of the discharge table assembly of Figure 1; Figure 19 is illustrative of the assembly of Figure 18 when the said assembly is operated to discharge packed containers from the table thereof; Figure 20 is a cross-sectional view taken along the line 20—20 of Figure 18; Figure 21 is a detailed view of an upper end portion of the rod 125 of Figure 18 illustrative of the parallel and spiral paths of guide grooves 136 therein; Figure 22 is a section of Figure 21 taken along the line 22—22 of Figure 21; Figure 23 is a section of Figure 21 taken along the line 23—23 of Figure 21; Figure 24 is a side elevation of a split tube unit which, when disposed around shaft 128 outside housing 123 of Figures 1 and 18, functions as a limiting stop for the downward travel of table 121; Figure 25 is a plan view of Figure 24 taken along the line 25—25 of Figure 24; and Figure 26 is a detailed section of a preferred vibratory unit of Figure 2.

With reference to the drawings, horizontally disposed rotatable shaft 43 (Figure 2) is supported at each end by bearings 43a in turn supported in upwardly extending frame portions 10a and 10b on base 10c and contains cranks 43b near each extremity. Each connecting rod 43c is connected at one end with a crank 43b and extends upwardly from the crank 43b and connects with a clevis 43e attached to an upwardly extending rod 43d, the latter rigidly connecting with the extremities 36 and 37 of a horizontally extending crosshead assembly 42. Shaft 43 is operatively connected with a power source (not shown) for rotating same and to thereby cause the rods 43c and 43d and crosshead 42, through cranks 43b, to reciprocate.

Crosshead 42 comprises a pair of horizontal beams 42a and 42b rigidly attached, respectively, to extended rods 43d at 36 and 37 to provide a reciprocable unit 42. Supported on crosshead 42 by attachment to, and between, horizontal members 42a and 42b is a plurality of substantially vertically disposed fluid tight cylinders 48, each cylinder 48 containing a piston 49 (Figures 1, 11 and 12) connected with a downwardly extending piston rod 44 and an upwardly extending piston rod 44a, each said rod extending longitudinally from cylinder 48, in fluid tight relation therewith, and each piston 49 being sealed in a cylinder 48 in fluid tight relation with the inner wall thereof, as discussed more fully with reference to Figures 11 and 12. Each rod 44 extends from a lower end of a cylinder 48 to a point where it is joined with a longitudinally, generally vertically, extending wooden rod 45 tipped at its lower end with a nonmetallic tip 46. Fluid inlet and outlet means (port 50 and port 53, Figures 11 and 12) are provided at spaced apart points in each cylinder 48 to convey fluid pressure to regulate longitudinal movement to tamp rods 45 with rods 44 and 44a and piston 49, independently of the reciprocating movement of the cylinders 48 that takes place by virtue of their attachment to crosshead 42 when the latter is driven by rotation of shaft 43.

Hopper 38 (Figures 1 and 2) with perforated plate bottom 40 is disposed below tamp rods 45 and spaced therefrom to permit each longitudinally moving rod 45 to be aligned with a perforation or nozzle 39 in plate 40 and to enter hopper 38 through the open top 47 thereof and move substantially through a nozzle 39, subject to the position of piston 49 in cylinder 48 as described hereinafter. Horizontally disposed stirrer assembly 41 comprises a pair of horizontal shafts 41b with paddle type blades 41c extending radially therefrom, and are disposed in tandem in a bottom portion of hopper 38. Shafts 41b extend through each end 35 of hopper 38 to journals 41d supported in bearing blocks 41c supported by beams 41f spanning end frames 10a and 10b. Stirrer shafts 41b are suspended in hopper 38, one on each side of the row of nipples 39, and are geared to rotate by application of a power source outside the system, so that the paddles 41c serve to move the powder over the line of nipples in synchronism with the tamps. The rows of paddles on each shaft 41b are spaced 180° apart and therefore each shaft 41b makes one-half revolution for each full cycle of the tamps.

A horizontally disposed platen 11 (Figures 1 and 2) is positioned below hopper 38 so as to support a plurality of upright cylindrical containers, each closed only at the bottom end with the open end in direct communication with a nozzle 39 to receive material from hopper 38 for packing therein. Platen 11 can be raised and lowered to adjust for height of the container to be supported thereon, as described more fully hereinbelow and with reference to Figure 8.

Platen 11 is supported at points near its extremities on resilient mountings 12, each being rigidly attached to a longitudinally, generally vertically disposed, movable piston rod 13a extending upwardly from a fluid cylinder 13, the rod 13a being lowered or raised by action of fluid in the cylinder 13 as described hereinafter. Each cylinder 13 is rigidly attached by bolting to face 32a of horizontal beam structure 32 which is rigidly supported at each end by bolting to the exteriors of the two hydraulic cylinders 64 described hereinafter. By regulation of fluid pressure in each cylinder 13, rods 13a and, consequently, platen 11 are movable upwardly and downwardly during the cycle as described hereinafter.

Each hydraulic cylinder 64 (Figures 2, 3, 8 and 9) is mounted on a fixed vertical piston rod 66 having a fixed piston 67 within the cylinder 64. A hydraulic connection 68 provides access of hydraulic fluid under pressure to the upper end of each rod 66 and down central bores to an exit above piston 67 into the space 69 between the sealed piston and the sealed upper cylinder head 65. Hydraulic fluid pumped under pressure into spaces 69 causes the cylinders 64 and beam structure 32 to rise. Withdrawal of hydraulic fluid, of course, permits cylinder 64 with beam structure 32 affixed thereto to lower by force of gravity. Beam 32 can thereby be raised and lowered prior to start-up of the machine to regulate the height of platen 11 for accommodation of packing containers of various heights.

A pneumatic vibrator 15 (Figure 2, and see also Figure 26) is bolted to the underside of platen 11 at 14, the piston 15a being adapted to impose a unidirectional power stroke toward the platen by fluid flow in cylinder 15, as described in more detail with reference to Figure 26. Other suitable vibrating means at 14 can be utilized if desired.

Horizontal rotatable shaft 72 (Figures 1, 2, 3 and 9) is pivotally supported at its ends in bearing blocks 77 directly above beam 32. Arms 31 are keyed to shaft 72 supported in hub 78. Arms 31 are braced by elongated brace, or plate, member 31a which is spaced away from, and parallel to, shaft 72 and is rigidly attached at its extremities to opposite arms 31 at intermediate points 31b thereon.

Each arm 31 extending from shaft 72 is movable in an arc around shaft 72. An elongated rack or shuttle member 30, which is in essence a rectangular block, containing a plurality of holes or openings 30a of such size as to receive and support elongated containers is disposed intermediate arms 31 and is pivotally connected at its upper end 30b, i.e., farthest from shaft 72, to the extremities of arms 31 with its opposite, or lower, end 30c free so as to thereby be suspended from arms 31.

Fluid cylinder 33 (Figures 1 and 3) is pivotally connected by trunnions 33a extending laterally therefrom to arms 31c rigidly connected to brace 31a so as, preferably, to span its center and to direct piston rod 33b toward shuttle 30. Rod 33b extending from cylinder 33 terminates in a tongue and clevis 33c attached to a lower rear point of shuttle 30, preferably at central point 30d. Thus, when rod 33c is moved longitudinally, shuttle 30 is caused to pivotally move about the pivoted connection 30e on arm 31.

Fluid cylinders 34 (Figures 1 and 3) are each pivotally connected by a pair of trunnions 34b extending laterally therefrom to a set of trunnion bearings 34c which are rigidly attached by bolting to face 32b of horizontal beam structure 32 rigidly supported at each end by bolting to the exteriors of cylinders 64 in a position so as to direct rod 34a from each cylinder 34 toward a clevis 31d and secure it as a tongue therein, each clevis 31d being part of a lower section of an arm 31.

Cylinders 33 and 34, when activated by fluid pressure, cause coordinated movement of arms 31 and shuttle 30 in the handling of containers during the cycle. Thus, by the operation of cylinders 33 and 34 to retract rod 34a and extend rod 33b, shuttle 30 is caused to assume the horizontal position I to be charged with empty containers; by retraction of rod 33b, shuttle 30 is then caused to assume position II and then by extension of rod 34a the shuttle 30 is caused to assume the vertical position III to support the loaded containers during the packing stage; and by subsequent extension of rod 33b the shuttle 30 is caused to assume the position IV to permit packed containers to fall therefrom.

Mounted above shaft 72 but not rotatable therewith is shelf 70 which serves to retain the empty containers within the shuttle 30 while the latter is moved from position I to position III.

Each horizontal shaft 29 is supported in a bearing 29a, the latter being part of the end frames 10a and 10b. An upwardly extending rod 20 is connected at its lower end to short arm 29b of each lever 29c (Figures 6 and 7) which is supported and synchronized by shaft 29 as the fulcrum. The opposite or long arm 29d of each lever 29c is pinned to clevises 28e connected with the end of rod 28a of fluid cylinder 28 so that the rod 20 can be raised or lowered by axial movement of the rod 28a, associated therewith, in response to regulation of fluid pressure in the cylinder 28. In this manner, upward and downward movement of each rod 20 is effected by regulation of fluid pressure in cylinder 28. Cylinder 28 is pivotally secured to end frames 10a and 10b at 28d. Inasmuch as the short arm 29b of lever 29c travels through an arc, the motion imparted to the rods 20 is not strictly vertical and, accordingly, the upper ends of rods 20 are loosely held in pinched guide bearings 20a.

Unit 19, an assembly for crimp-closing the packed containers, includes a horizontally extending beam member 21, also referred to herein as a pin beam, rigidly supported by an upper portion of each rod 20 extended through extremities 21a of the said member. Member 21 is secured to each rod 20 at those points by nuts 27 so as to be reciprocable with rods 20. Each rod 20 extends upwardly into a closed pinched guide bearing 20a which is rigidly attached to frames 10a and 10b and which serves to support the rod 20 in its longitudinally disposed position. Member 21 has protruding from its lower face a plurality of downwardly extending short rods or pins 24 which serve as crimping plungers, as later described.

Each fluid cylinder 25 (Figures 4 and 5) is secured to the top side of member 21 at points 21b and contains a piston 26 and a piston rod 26a with each rod extending through a longitudinally extending opening 21c of member 21 and downwardly from member 21.

Horizontally extending member 22, also referred to herein as a folder beam, is disposed below member 21 in spaced apart relation thereto and substantially parallel to member 21 and is suspended from beam 21 by its attachment at each end portion 22a to bolt member 22b. Bolt member 22b upwardly extends through opening 21d of member 21 in loose fit therein to permit movement of bolt member 22b through member 21. Each bolt 22b is terminated at its upper end, i.e., on the top side of member 21 with a stop nut 22c to prevent movement of the end of bolt 22b through opening 21d.

Beam 22 is forcibly separated from beam 21 by rods 26a extending from cylinder 25 wherein a constant source of fluid pressure acts as a uniform deflection spring.

Member 22 contains a plurality of openings 23 extending downwardly therethrough and terminating in flanged form 23a as folding dies referred to hereinafter. Each opening 23 is in alignment with a pin 24 and contains a pin 24 axially disposed therein which terminates short of or slightly entering a die 23a when the machine is out of crimping position. When rods 20 are moved downwardly by action of cylinders 28 and levers 29c, beam member 22 moves on to the top of the containers to be closed to fold them partially shut by pressing action of dies 23a. The travel of beam 22 is limited by the stops 9 in order not to crush or buckle the containers. Beam 21, brought down by action of cylinders 28 and levers 29c, is disposed to overtravel so as to bring the pins 24 through the openings 23 and 23a onto the folded closure to press home the folded container wall portion to thereby secure the folds to complete the closure. The latter is effected by action of cylinders 28 and levers 29c on rods 20 to pull member 21 downwardly, as above described.

Horizontal shaft 17 (Figures 1, 4 and 5), also referred to herein as an anvil in view of the action thereon during the crimp step, is disposed below, and substantially parallel to, member 22 and supports a rack 16 which is positioned so as to support, in conjunction with guide strip 22c attached to beam 22, the elongated containers while in substantially vertical alignment with folding dies 23a. Shaft 17 is rotatably supported at each end in bearings 17a supported in end frames 10a and 10b and extends through one bearing 17a into key contact with lever 17d radially extended therefrom and engaged by hooks 18c and 18d on the ends of the piston rods of fluid cylinders 18a and 18b, respectively, which by regulation of fluid pressure in each cylinder cause movement of lever 17d to rotate shaft 17 to a predetermined degree to thereby move rack 16 into one of three positions shown in Figure 1, i.e., it can be in (1) position 16b for receiving the packed containers, (2) in vertical position, as shown, for the crimping operation, or (3) in forward position 16f for discharge of the finished containers. Cylinders 18a and 18b are yoked together with trunnions supported in frame 10a, as illustrated with reference to Figure 17.

Discharge table assembly 120 (Figures 1, 18–23) contains table 121 supported in horizontal position in close proximity to anvil shaft 17, in front of rack 16, and at a level so as to receive crimp-closed containers from rack 16 when the latter is tipped forward to discharge containers therefrom. Cam rod 125 is disposed in fluid tight cylindrical housing 123 coaxial therewith and secured to the lower end closure 124 of said housing to form an annulus 126 with the inner wall 130 of housing 123. The upper end closure 122 of housing 123 is supported in a forward extension 10f of base 10c and serves to tip forward the axis of housing 123 at an angle, of say 16°, from the vertical. Cam rod 125 longitudinally extends from lower end closure 124 through at least a major proportion of housing 123. Hollow piston rod, or shaft, 128 is closed at its upper end 129 and is connected at end 129 at an acute angle with table 121 as a support for table 121 outside housing 123 and above end closure 122. Hollow shaft 128 extends coaxially through end closure 122 in fluid tight relationship therewith and into annulus 126 formed by cam rod 125 and housing 123 concentric with and surrounding cam rod 125. Shaft 128 is longitudinally movable in housing 123 through upper closure 122 and along rod 125. Piston 132 is transversely disposed in housing 123 in fluid tight relationship with the inner walls of housing 123 and shaft 128 and is secured to shaft 128, generally to its bottom end, intermediate the said bottom end and the end housing closure 124. In a now preferred form, piston 132 is an enlarged section of the lower end of shaft 128 and is grooved along its outside surface to accommodate seal ring 135 so as to be disposed in fluid tight relationship with the inside wall of housing 123 and is disposed in fluid tight relationship with rod 125. Piston 132 is longitudinally slidable in elongated housing 123. Guide grooves 136 (Figures 18, 20, 21, 22 and 23) are disposed along cam rod 125 parallel with the axis of the said rod for a distance generally greater than ½, preferably at least ⅘, the length of the rod, and then along parallel spiral paths toward the upper end 125a of the rod. Rod elements 138 are transversely secured in piston 132 and extend inwardly into grooves 136 and are supported therein by rollers 139. The grooves 136 are generally disposed along substantially the entire length of cam rod 125, being generally somewhat longer, to the extent required for optimum assembly and operation.

Fluid conduit 133, by way of frame extension 10f, extends downwardly through upper closure 122 and lower closure 124, into a lower end of housing 123 at a point below the lowest point of travel of piston 132, intermediate piston 132 and end closure 124, to convey fluid pressure into housing 123 below piston 132. Fluid conduit 134, by way of extension 10f and upper closure 122, extends into the upper end of housing 123 above piston 132 at a point above the highest point of travel of piston 132, intermediate piston 132 and closure 122. Fluid pressure applied through conduit 133, while conduit 134 is open to exhaust, acts upon piston 132, piston rod 128 and table 121 causing them to rise, and during ascent they are guided by rollers 139 in grooves 136. For that portion of the ascent that the rollers 139 are in the straight portion of the grooves 136, the table 121 is nonrotatable, but as the rollers enter the spiral portion of the grooves 136, the piston 132, rod 128 and table 121 are caused thereby to rotate and to continue to do so, generally until the piston 132 contacts the upper end closure 122. In a preferred embodiment the rotation will be about 20° and this rotation in conjunction with the angular mounting of the table 121 on piston rod 128 causes the table 121 to dip at one end and rise at the other end so that the table assumes an inclined position at an angle of about 6° to the horizontal, sufficient for any packed containers thereon to roll off. Conversely fluid pressure applied through conduit 134, while conduit 133 is open to exhaust, will reverse the action causing the table 121 to rotate back to normal and descend to its receiving position.

Table 121 is always caused to move to the uppermost position, i.e., so that piston 132 is substantially in contact with top closure member 122. To receive containers of less than maximum length, the downward travel of the table must sometimes be arrested at less than full stroke. For this purpose a suitable stop for the downward travel of table 121 is provided, such as a split tube 140 (Figures 24 and 25) of requisite length snapped over a portion of the extended rod 128 outside the housing 123 and adjacent closure 122 to limit the downstroke to position the table, at its lowest level, substantially opposite anvil 17 to receive crimped containers from rack 16.

Power to drive the camshaft 141, supported by bearings 149 and carrying cams 142, i.e., cams 1—8 is taken from the main drive shaft 43 by means of chain 143, gear reducer 144 and vertical shaft 146 terminating in one-half of miter gear set 147. The other gear of set 147 is affixed to the driving member of a standard one-revolution clutch 148. An additional stop pin (not shown) added to clutch 148 provides a partial revolution clutch with uneven intervals of 145° and 215°. Stoppage of the driven member of the clutch 148 and the camshaft 141, keyed thereto, is by means of the latch pin illustrated only in Figure 14.

Unit 101 (Figure 1) is a feeder device for supplying empty cylindrical containers to the machine for packing. Feeder 101 comprises hopper 102 with front and back sides 102a and 102b spaced from the bottom side 102c a distance greater than the outside diameter of the elongated containers to be fed to the machine. Hopper 102 is supported on legs 102e and slidably mounted on two inclined rails 10d extending rearwardly from frame 10a and 10b and braced on frame 10c. The complete unit 101 is slidably mounted on the inclined rails 10d so that it can be moved up and down to suit the elevational adjustment of the platen 11, shuttle 30 and associated structure while being simultaneously moved toward and away from the platen, shuttle and associated structure to accommodate various shell lengths.

The internal surface of the bottom 102c of hopper 102 is grooved in a direction towards shuttle 30 so as to accept elongated containers and deliver same lengthwise into shuttle 30 via openings 30a. Fingers 103, aligned with grooves 102d in the bottom 102c of hopper 102, are disposed rearwardly of hopper 102 and together with piston rod 105 of fluid cylinder 106 are secured in parallel to tie bar 104 so that when fluid pressure in cylinder 106 is regulated to longitudinally move rod 105, fingers 103 are caused to move horizontally so as to displace containers from the grooved hopper bottom to the shuttle, or so as to move away from the emptied grooves as the case may be.

Each fluid tight cylinder 48 (Figures 11, 12 and 13) is closed at its bottom end 48c and top end 48d, respectively, by closure heads 48a and 48b. Piston 49 in cylinder 48 is slidable therein and is maintained in fluid tight relation with the cylinder walls by ring seals 49a and 49b. Rod 44 within cylinder 48 is connected with the end 49c of piston 49, generally axially, and extends from piston end 49c through closure head 48a outward and downward. Rod 44a within cylinder 48 is connected with the end 49d of piston 49, generally axially, and extends from the piston end 49d through closure head 48b outward and upward.

Port 50 in an upper side wall of cylinder 48 (Figures 1, 2, 11, 12) is connected with an outside fluid source by means of manifold 51 and is located generally in close proximity to closure head 48b but, in any event, always in direct communication with the interior of cylinder 48 and the end 49d of piston 49. Preferably, closure head 48b acts as a stop for piston 49 to prevent passage to a point such that seal 49a would cross port 50.

Port 53 in a lower side wall of cylinder 48 is connected with an outside fluid source by means of manifold 54 and is disposed in close proximity to seal 49a, but between seals 49a and 49b of piston 49, when piston 49 is in its lowermost position in cylinder 48, generally abutted against closure head 48a.

Groove 73 in rod 44 extends from piston end 49c along rod 44 for a distance sufficiently great that it affords direct communication between the interior of cylinder 48, below piston 49, and beyond seal 75 during that portion of the downward travel of piston 49 toward cylinder closure 48a when seal 49b has passed port 53. Thus, during the downward travel of piston 49, groove 73 serves to vent cylinder 48 of fluid that would otherwise be trapped therein when seal 49b passes port 53. Likewise, when piston 49 is started upward toward cylinder closure 48b as described hereinafter, groove 73 provides access of fluid along rod 44 through seal 75 into cylinder 48 below piston 49 until seal 49b has passed port 53, after which time the only fluid admitted into the space below piston 49 in cylinder 48 is through port 53.

An orificed cam member 56, outside and above cylinder 48, is slidably mounted on an extension 48e of closure head 48b and is freely movable upwardly. It is adapted to be pushed slightly upward and away from cylinder 48 by the outer end of rod 44a engaging extensions 58 when rod 44a is fully extended from cylinder 48 by the movement of piston 49 toward closure head 48b and substantially in contact therewith. Cam member 56 is adapted to be moved slightly downward toward cylinder 48 by nut 57 near the end of rod 44a when the piston 49 is extended toward closure head 48a and substantially in contact therewith.

Near the lower extremity of cam member 56 is an extended cam member portion 59 which, as cam member 56 is moved toward cylinder 48, engages bar cam member 60 attached to a rotatable shaft 61 mounted in bearing members 62. Bar cam 60 is of such length (Figure 13) as to be engaged by each extended portion 59 of each cam member 56, one for each cylinder 48. On one end of shaft 61 is mounted a lever 63 (Figure 12) which engages the stem of a spring-loaded normally open two-way valve NO–2W–3, shown in the control system diagram of Figure 14. As shown in Figure 12, the stem 79a of NO–2W–3 79, being spring-loaded, outwardly engages the end of lever 63 and has the effect of turning shaft 61 to rotate clockwise. When each cam member 56 is brought downward, the beveled faces of extended portions 59 engage bar cam member 60 and the combined forces rotate shaft 61 counterclockwise against the pressure of the spring in valve 79. As extended portion 59 continues downward, the tip of the bar cam member 60 rides off the bevel of portion 59 onto its flat vertical face. This, in effect, locks bar cam 60 against any slight movement of portion 59 such as might result from the reciprocating motion of the entire crosshead member 42 and against slight movements of rods 44a. The counterclockwise rotation of shaft 61 and lever 63 also acting on valve NO–2W–3 serves to close that normally open valve.

Until all piston cylinder assemblies have operated to remove extended portions 59 from contact with bar cam 60, shaft 61 remains stationary inasmuch as bar 60 is not movable until all beleved elements 59 have been moved from contact with it. Thus when the extended portion 59 of the last unit to operate clears and releases bar cam 60, that member, shaft 61 and lever 63 are all free to rotate and they do rotate clockwise by the force of the spring valve 79, the valve then opening to function in the automatic control system.

The machine of Figures 1 through 26 operates as an automatic device to feed, load, crimp and discharge finished containers under control of a suitable system for maintaining the necessary sequence of operation of the machine elements, preferably a timing mechanism in conjunction with the fluid stream flows associated with the various fluid cylinders above described. However, any suitable control mechanism other than that specifically illustrated, such as one utilizing time-delay or sequence valves, can be utilized to maintain the necessary operating sequence of the machine elements in the practice of the invention.

The now preferred timing system is illustrated with reference to the drawings and with especial reference to a diagrammatically shown air control circuit of Figure 14. Figure 14 shows the control circuit at a point after a last load of shells has been packed with a fluent solid material, crimped and discharged and the machine has come to rest. Thus, as shown with reference to Figure 1, the machine shell feeder fingers 103 are retracted, the shuttle 30 is down in back and horizontal position I, the platen 11 is in its down position, the crimper rack 16 is in its vertical position, the crimper unit 19 is up, the tamp rods 45 are in the retracted or short position, and the cams 142 are stationary with the second stop pin of the partial revolution clutch against the extended latch pin, not shown but illustrated with reference to Figure 14. In starting the machine, which is done by operating the stop-start valve, it is assumed that (1) the machine elements for the given size, diameter and length of explosive cartridges or packed containers to be produced are in place, i.e., such as tamp rods 45, nipple plate 40, shuttle 30, shell-feeder unit 101, crimper rack 16, crimper fold dies 23a and pins 24; (2) the central structure 107 carrying the platen 11 and shuttle 30 has been adjusted to the proper distance below the nipples 39 for the length of the cartridge to be produced; (3) the shell-feeder unit 101 has been adjusted on its inclined rails 10d (45°) to properly feed shells to the shuttle 30; and (4) the downward travel of the discharge tray 121 has been limited to the proper height to receive the given length of cartridge when discharged by the crimper rack 16.

In Figure 14 full lines indicate pressurized air of say about 60 p.s.i., dot and dash lines indicate lower pressure air of say about 30 p.s.i., and dotted lines indicate air lines open to exhaust. Valve symbols NO and NC designate, respectively, normally open and normally closed; 2W, 3W and 4W designate two-way, three-way and four-way valves. The conventional symbol for manually operated and cam operated three-way valves is used.

With shells in place in hopper 102 of the shell-feeder unit 101, the main drive shaft 43 rotating to reciprocate the crosshead unit 42 with tamps retracted as shown in Figures 10-1 and 10-2, and the stirrers 41 rotating in synchronism with the crosshead unit, the conveyor belt 38a is started to feed powder to the hopper 38 followed by setting the main control valve at "Start." At once the platen 11 goes up, the shuttle 30 retracts to position II and then by means of arms 31 moves to position III, but at the same time the latch pin is withdrawn and the cams start rotating. This initial action takes place because the "Start" valve exhausts air from the pilot of four-way valve 4W-9 which reverses by spring action and on reversing sends pressurized air to the manifold serving pilot valves PV-8, PV-1, PV-4, PV-5 and PV-6. As PV-8 and PV-6 are closed, no air passes them. However, PV-1 is open and passes air to the pilot of 4W-1 which reverses and sends air through A1 to cylinders 13 which operate to send the platen 11 up. PV-1 also passes air to reverse 3W-5, but with results to be described with PV-5 and 4W-5. As PV-4 also is open it passes air to the pilot of 4W-4 which reverses and passes air through A7 to cylinder 33 which operates to retract shuttle 30 to position II. Also PV-5 is open and passes air to the pilot of 4W-5 which reverses and passes air through A3 to cylinders 34 which operate to send the shuttle 30 up to position III When 4W-5 is reversed it exhausts, by way of line A10 and 3W-5, the air from the pilot of NO-3W-3 which then opens to let pressurized air flow to the single acting latch pin cylinder to thereby withdraw the latch pin from engagement with the second pin of the partial revolution clutch on the camshaft and cause the camshaft to start to rotate.

With the start of the camshaft the machine is on its automatic cycle, but on the first cycle no action takes place except for the starting of the first batch of shells, as above described. The following description, then, corresponds with the second cycle which follows the cams through a full revolution of 360° as described below with reference to Figure 15.

At approximately index 10° cam one allows PV-1 to close which exhausts the pilot of 4W-1 which reverses, by spring return, and passes air through line A2 to cylinders 13 which operate to lower the platen 11. Air from line A2 also goes to line 133 to lower the discharge table 121. PV-1 also exhausts air from one pilot of 3W-5 but that valve remains unchanged.

At index 15° cam three allows PV-3 to close which exhausts the pilot of 4W-3 which reverses and passes air through A6 to cylinder 18a which operates to bring the crimper rack 16 back to receiving position 16b.

When the platen 11 is lowered, the loaded shells break away from the nipples 39, leaving packed cores therein, and settle down through the loosely confining shuttle 30 to rest on the platen 11 again. Allowing time for this to happen, the next cam action is at index 40° when cam four allows PV-4 to close which exhausts the pilot of 4W-4 which reverses and passes air through line A8 to operate cylinder 33 which extends shuttle 30 to position IV. This action swings the lower ends of the packed shells out beyond the front edge of the platen 11 and they slide out of the shuttle 30 and are caught by and come to rest on the crimper rack 16 in position 16b.

Allowing time for the loaded shells to clear the shuttle 30 at index 90°, cam three opens PV-3 and cam five allows PV-5 to close. When PV-3 opens it passes air to the pilot of 4W-3 which reverses and passes air through line A5 to cylinder 18a which operates to swing the crimper rack 16 to a vertical position under the crimper unit 19. When PV-5 closes it exhausts air from the pilot of 4W-5 which reverses and passes air through line A10 to cylinders 34 which operate to bring the shuttle 30 down and back to horizontal position I in line with the shell-feeder unit 101; at the same time air from line A10 passes through 3W-5 to the pilot of NO-3W-3 which closes and exhausts air from the latch pin cylinder (not shown) allowing the latch pin to extend to later engage the first stop pin on the partial revolution clutch.

Allowing time for the crimper rack 16 to assume its vertical position at index 120°, cam seven opens PV-7 and passes air to the pilot of 4W-7 which reverses and passes air through line A13 to cylinders 28 which operate through levers 29c pivoted through synchronizing shaft 29 and pull-rods 20 to pull down the pin beam 21 and thus the entire crimping unit 19. Suspended below pin beam 21 by means of hanger bolts 22b in folder beam 22, and acting to hold the two beams apart within the limit of the hanger bolts 22b, are the piston rods 26a with their pistons 26 within air cylinders 25, these cylinders being supplied with a constant source of pressurized air so that they act as springs with a uniform deflection rate. Attached to the front face of folder beam 22 is a serrated stop and guidance strip 22e which had previously engaged the upper ends above the powder line of the packed shells, when they were brought forward by the crimper rack 16. Also, imbedded in the lower face of folder beam 22 are the folder dies 23a, and below the beam the guide strip 22e supports the open ends of the packed shells in line with the dies 23a. As pin beam 21 is pulled down, folder beam 22 is forced down ahead of it and the dies 23a engage the open ends of the shells and bend these ends inward in a star-like pattern to cover the packed powder. The downward travel of the dies 23a, if too great, would crush the packed shells so this travel is limited by the stops 9 which engage the ends of the folder beam 22. Imbedded in the lower face of the pin beam 21 are pins 24 which project downward across the gap between the two beams 21 and 22 and through holes in folder beam 22 to just enter the dies 23a. As the downward travel of the folder beam 22 is interrupted by the stops 9, the pin beam 21 continues downward against the air pressure within cylinders 25 acting against pistons 26 and piston rods 26a. As the pin beam continues downward, the pins 24 engage the folded-in top of the shells to flatten the folds and depress them slightly to complete the crimping operation and to complete the production of the cartridges.

Meanwhile, at index 130° cam six opens PV-6 passing air to the pilot of 4W-6 which reverses and passes air through line A11 to cylinder 106 of the shell feeder unit 101, said cylinder operating to move forward the fingers 103 which push forward the lower layer of empty shells in feeder hopper 102 so that they enter shuttle 30.

At index 145° just after the shell feeder fingers 103 have started, but before they have had time to complete their stroke, the cams stop rotating through the engagement of the latch pin and the first stop pin on the partial-revolution clutch. This stop is advantageous inasmuch as due to wax-stuck or crossed shells the shell-feeder may be unable to complete its stroke, and in that event the pause enables the operator to clear the blockage. However, when the stroke is complete, finger bar extension 150 opens valve NC–3W–6 allowing air from line A11 to pass through to line A15 and on to one pilot of 3W–5 which closes and exhausts air from the pilot of NO–3W–3 which opens and passes air to the latch pin cylinder, withdrawing the latch pin and allowing the cams to rotate again.

At index 160° cams six and seven allow the closing of PV–6 and PV–7. As PV–7 closes, it exhausts air from the pilot of 4W–7 which reverses and passes air through line A14 to cylinders 28 which operate through levers 29c and rods 20 to raise the crimper unit 19.

As PV–6 closes, it exhausts air from the pilot of 4W–6 which reverses and passes air through line A12 to cylinder 106 which operates to send the shell-feeder fingers 103 back which allows the empty shells in the hopper 102 to settle in the grooves in front of the fingers 103.

Allowing time for the shell-feeder fingers 103 to retract away from the shells in the shuttle 30 at index 180°, cam four opens PV–4 which passes air to the pilot of 4W–4 which reverses and passes air through line A7 to cylinder 33 which operates to retract shuttle 30 to position II. At index 185° cam five opens PV–5 which passes air to the pilot of 4W–5 which reverses and passes air through line A9 to cylinders 34 which operate through arms 31 to raise shuttle 30 to position III, depositing the empty shells in a vertical position on the platen 11 directly below the nipples 39.

Meanwhile, at index 200° cam two opens PV–2 which passes air to the pilot of 4W–2 which reverses and passes air through line A3 to cylinder 18b which operates to swing the crimper rack 16 forward to position 16f where it discharges the finished cartridges side by side onto the discharge tray 121. At index 220° cam two allows PV–2 to close and it exhausts the pilot of 4W–2 which reverses again and passes air through line A4 to cylinder 18b which operates to bring the crimper rack 16 back to the vertical position where it will be out of the way of the shells on the discharge table 121 when the table rises.

Allowing time for the shuttle 30 to have deposited the empty shells on the platen 11 and for them to have settled on platen 11 at index 220°, cam one opens PV–1 which passes air to the pilot of 4W–1 which reverses and passes air through line A1 to the cylinders 13 which operate to raise the platen 11 a distance sufficient to push the empty shells upward within the loose confines of the shuttle 30 so that their open ends embrace the nipples 39. At the same time air from line A1 also goes to line 134 to raise the discharge table 121.

With the shells engaging the nipples 39 at index 240°, cam eight opens PV–8 which passes air to the pilot of NO–3W–2 which closes to shut off the line from NO–2W–3 and exhaust air from one pilot of 2W–4. Air from PV–8 goes to the other pilot of 2W–4 which opens and passes air through line A16 to the vibrator 15 causing piston 15a to operate to vibrate the platen 11 and the shells standing thereon. NO–3W–2 when closed also exhausts, by way of open NO–3W–3, the latch pin cylinder. This allows the latch pin to extend to position to later intercept the second stop pin on the partial-revolution clutch.

Air through PV–8 also passes to the pilot of NO–3W–1 which closes and exhausts air by way of ports 53 from beneath the pistons 49 of the tamp cylinders 48 on the crosshead 42. Also, NO–3W–1 exhausts air from the pilot of NO–2W–1 which closes to terminate the supply of low pressure air by way of port 50 to above the pistons 49; and also exhausts air from the pilot of NO–2W–2 which opens and passes high pressure air through port 50 to above the pistons 49. With no pressure below and high pressure above, all pistons 49 move downward within the cylinders 48 and, in effect, lengthen the tamp rods 45 so that as the crosshead 42 strokes up and down, the range of the tamp tips 46 is from just above the line of the powder in the hopper 38, downward, to just through the nipples 39 as shown in Figures 10–3 and 10–4. On the first such stroke downward, the tamp tips 46 knock the packed cores of powder out of the nipples 39 into the waiting shells below, and each succeeding stroke downward pushes more powder through the nipples into the shells. Meanwhile, the conveyor belt 38a is delivering more powder to the hopper 38 and the stirrers 41 keep feeding powder to the space above the nipples 39 as fast as the tamp tips 46 push it through the nipples 39.

As each tamp is lengthened by air forcing each piston 49 down within the cylinders 48, the nuts 57 on the upper ends of rods 44a engage and carry downward the cam members 56 whose extensions 59 engage bar cam member 60 attached to shaft 61 and rotate it, slightly, in a counterclockwise direction (Figures 11–13). At one end of shaft 61 is a lever 63 that engages the actuating stem of valve NO–2W–3 and as shaft and lever rotate, they cause valve NO–2W–3 to close against the resistance of an internal spring. There is a slight overtravel in the downward movement of cam member 56 and its extension 59 with relation to the tip of bar cam member 60 which serves to keep these parts in engagement later when the building of cores in the nipples 39 will cause short upward separations of the nuts 57 from the cam members 56.

Allowing time for the tamps backed by high pressure air to have knocked out all cores, a matter of one or two full strokes, at index 350°, cam eight allows PV–8 to close and exhaust one pilot of 2W–4 but that valve remains open and continues to pass air through line A16 to the vibrator 15. On closing, PV–8 also exhausts air from the pilot of NO–3W–1 which opens and passes high pressure air to the ports 53 of tamp cylinders 48 but as these ports 53 are straddled by the O-ring seals of piston 49, the pressure is equal on the two seals and no movement of piston 49 results. PV–8 also exhausts the pilot of NO–3W–2 which opens to clear the line from closed NO–2W–3 through open NO–3W–3 to the latch pin cylinder for later use.

The cams coast to the end of one complete revolution to index 0° and are stopped by the second pin on the partial-revolution clutch contacting the extended latch pin.

The machine is now in the packing portion of its cycle with the tamps forcing powder through the nipples and into the shells, and vibration, transmitted through the platen to the shells, serves to pack the powder to the required density. Any resistance the tamp tips may encounter in pushing the powder through the nipples is overcome by the force of the low pressure air entering port 50 above the piston 49.

As the level of the powder in each shell rises, it eventually reaches the nipple and will continue to rise filling the nipple to form a core therein. But as the nipple is within the stroke of the tamp tip, the tamp tip 46, the tamp stick 45, the piston rod 44 and 44a and piston 49 will all be forced back, at the bottom of each stroke, a distance equal to the core build-up in the nipple 39 as shown in Figure 10–5. As the piston 49 is pushed upward at the bottom of each core-building stroke, the lower seal ring 49b on the piston 49 approaches closer and closer to high pressure port 53 until finally as the nipple is filled, this seal ring 49b passes port 53 and high pressure air entering therein works against the underside of the piston 49 to overcome the force of the low pressure air above the piston with the result that the piston quickly rises to the limit of its upward travel within cylinder 48. The effect of this is to shorten the tamp so that the range of the tamp tips stroke, or travel, will be entirely above the level of the powder in the hopper 38 (Figures 10-1 and 10-2).

Although all shells would be expected to be filled during the same time interval and all tamps shortened during the same time, there is usually a variation of two or three strokes. As each tamp does become shortened, the upper end of rod 44a contacts the upper overhang 58 of cam member 56 and raises the entire cam member 56 slightly so that extension 59 is moved out of contact with the tip of bar cam 60 and, in effect, releases that member 60.

When the last tamp is shortened and the last extension 59 releases bar cam 60 that cam and shaft 61 are free and they rotate clockwise under the force of the spring in valve NO-2W-3, the valve stem and lever 63 on the end of shaft 61. When released, NO-2W-3 opens and passes air through NO-3W-2 and NO-3W-3 to the latch pin cylinder which operates to withdraw latch pin and the cams start rotating. The cycle is then repeated.

When at the end of a run it is required to stop the machine, the manually controlled stop-start valve should be turned to "Stop" during the packing portion of the cycle of what is to be the last batch of shells. The operation of this valve sets up an open line from the currently exhausted line A10 to the pilot of 4W-9. After the shells currently being packed have been packed and are dropped out of the shuttle, the next cam action closes PV-5. When PV-5 closes it exhausts air from the pilot of 4W-5 which reverses and passes air through line A10 to cylinders 34 which operate to bring the shuttle 30 to position I. At the same time air from A10 passes through 3W-5 to the pilot of NO-3W-3 which closes and exhausts air from the latch pin cylinder allowing latch pin to extend to later engage the first stop pin. Also, air from A10 passes through the stop-start valve to the pilot of 4W-9 which reverses and exhausts air from the manifold serving pilot valves PV-8, PV-1, PV-4, PV-5 and PV-6. Next cam seven opens PV-7 and passes air through line A13 to, as previously explained, bring down crimping unit 19. Next cam six opens PV-6, but with the manifold exhausted no air passes through PV-6 and the shell-feeder does not operate. Next the first stop pin contacts the latch pin and the cams stop rotating. With the shell-feeder inactivated the machine stops with the crimper unit 19 down on the crimped cartridges. To release the crimper 19, another manually operated valve has been provided and now turning this valve to "crimper release" will briefly allow air from 4W-9 to pass to the latch pin cylinder (not shown) to withdraw the latch pin and allow the cams to proceed. Cam seven will then close PV-7, and 4W-7 will reverse sending the crimper unit up. Cam eight will open and close PV-8 but with no air in the manifold, nothing happens and since the crimper-release valve was opened only briefly, its return to normal again exhausts air from the latch pin cylinder and the latch pin extends and its contact by the second stop pin will stop the cams and the machine will have stopped with the control again as shown in Figure 14.

As disclosed in the above referred to application Serial No. 134,530, it has been discovered that the packing of materials into containers at high uniform density is best effected by means of vibratory movement in which the power stroke in each oscillation is applied in only one direction. Thus, in the embodiment of the invention it is preferred to employ a vibrator in which the power stroke of the piston is in the upward direction and the piston is allowed to fall free after each power stroke, cushioned only by the air escaping during the exhaust stroke. For many materials, particularly the lighter materials, the frequency of vibration is quite important to obtaining optimum results. Thus, it is often desirable to employ different vibratory frequencies when packing different types of materials. To obviate the necessity of changing vibrators, it is often desirable to use a vibrator with a controllable frequency such as that disclosed in U.S. 2,609,791. Although electric and hydraulic vibrators may be employed, if desired, best results are obtainable with pneumatic vibrators. From the standpoint of safety it is not desirable to employ an electric vibrator for the packing of explosives. Pneumatic vibrators are generally preferred over hydraulic vibrators due to the fact that the pneumatic vibrator is generally characterized by a higher frequency which is usually necessary to satisfactorily pack most materials from both the standpoint of ultimate density and the time required to reach that density.

In Figure 26 is shown a part sectional, part elevational view of a pneumatic vibrator having a unidirectional power stroke which can be utilized as a platen vibrator in accordance with the invention, e.g., as vibrator 15 of Figure 1. A reciprocable piston 80 is disposed in a cylinder 81 formed by a casing 82. The lower portion of the casing 82 is formed by a cylinder head 83 which is held in airtight relationship to the remainder of the casing 82 by a gasket 84 and studs 85. An annulus 86 is formed in the wall of the cylinder at a point equidistant from the ends thereof. Passages 87 and 88 are formed in the outer periphery of piston 80 at points which register with the center of annulus 86 when the piston 80 is alternately at the end of either its exhaust or power stroke. A duct 89 leads from the passage 87 through the piston 80 to the bottom of piston 80. A duct 90 leads from the passage 88 through the piston 80 to the top of the piston 80. Duct 90 is plugged with a threaded plug 91. Exhaust ports 92 and 93 are disposed in the wall of the cylinder at a point equidistant from the ends of the cylinder. The distance between the exhaust ports 92 and 93 is such that during reciprocation one end of the piston begins to cover one exhaust port just as the opposite end of the piston begins to uncover the other exhaust port. A threaded air inlet port 94 (see line A16 of Figure 2) is disposed in one side of the casing 82 and leads into the annulus 86. A threaded air inlet port 95 is disposed in the opposite side of the casing 80 and also leads into the annulus 86. A threaded plug 96 is disposed in the air inlet port 95.

The vibrator shown in Figure 26 operates as follows. Pressurized air is introduced through air inlet 94 and flows into annulus 86 into the passage 87 and through duct 89 to the bottom of the cylinder 81. The piston 80 is forced upwardly by the pressurized air until the passage 87 travels beyond the annulus 86 and the exhaust port 92 is uncovered by the bottom of the piston 80. The upward stroke of the piston 80 is cushioned somewhat by the air cushion formed in the upper part of the cylinder 81 once the upper portion of the piston 80 has closed off the exhaust port 93. At the completion of its upward power stroke the piston 80 falls freely with its downward fall, being cushioned by the air cushion formed when the lower portion of the piston closes the exhaust port 92. As soon as the passage 87 again registers with the annulus 86, air is again admitted to the bottom of the cylinder 81. The duct 90 and passage 88 leading to the top of the piston 80 from the annulus 86 are provided to allow use of the vibrator shown with a power stroke in the opposite direction when the duct 89 is plugged and the duct 90 is unplugged. If both ducts are left unplugged, a conventional two-way power stroke is obtained. The passages 96, 97 and 98 which are plugged by studs 95, 99 and 100, respectively, are provided for attachment of a frequency control valve such as that shown in U.S. 2,609,791.

While it is generally desirable to employ a pneumatic, hydraulic, or electric vibrator to impart the necessary vibratory movement to the platen, the desired movement may be generated by other mechanical means.

Although the table assembly 120 has been specifically illustrated as operative in respect to movement of the platen 11 into, and out of, the defined operative position for engaging the containers, with nipples for packing, other suitable means for synchronizing ascent and descent of the table member 121, with the machine, can be employed. Thus, the axial movement of shaft 128 can be synchronized by a separate timing means, such as of the cam type illustrated with reference to the drawings, to regulate the ascent and descent of the table to occur concurrently with the feeding of containers to the crimp means and operation of the crimper to close the containers, so that the table will be in position to receive crimp-closed containers from the crimp assembly for discharge.

Alternative to support rod 125 in housing 123 as affixed to the end closure 124 or as an integral part thereof, rod 125 can be supported in housing 123 by any suitable means such as by a spider connection engaged with the inner side wall of the housing 123 below the lowest point of travel of piston 132 therein.

As will be evident to those skilled in the art, various modifications can be made or followed, in the light of the foregoing disclosure and discussion, without departing from the spirit or scope of the disclosure or from the scope of the claims.

What I claim and desire to protect by Letters Patent is:

1. Apparatus for receiving materials and then delivering same for further handling which comprises a shaft adapted to be moved axially; means for supporting said shaft; means for axially moving said shaft a predetermined distance; a table rigidly supported at one end of said shaft at an acute angle therewith; and means associated with said shaft for guiding same in a state of rotation throughout at least a portion of its travel when axially moved.

2. In apparatus of claim 1, means for guiding axial movement of said shaft successively in a static state and in a state of rotation.

3. Apparatus for receiving packed containers from a packing machine and then delivering same for further handling which comprises an upwardly extending shaft adapted to be moved axially; a table rigidly supported on said shaft at an upper end thereof, and disposed at an acute angle with said shaft; and means associated with said shaft for axially guiding same upwardly, first in a static state and then in a state of rotation.

4. Apparatus for receiving packed containers from a packing machine and then delivering same for further handling, which comprises a fluid tight housing; a shaft extending into said housing in sealed fluid tight relationship therewith and axailly movable through said seal; a table rigidly supported on the end of said shaft outside said housing at an acute angle therewith; means within said housing for guiding said shaft, when axially moved through said seal toward the outside of said housing, first in a static state and then in a state of rotation.

5. Apparatus for receiving packed containers from a packing machine and then delivering same for further handling which comprises an elongated fluid tight housing member; a first shaft member longitudinally disposed within said housing so as to form an annular space with the inner walls of said housing, and secured in a fixed position; a second shaft member having a hollow end section extending along at least a fraction of its length, and closed at its opposite end; said second shaft longitudinally extending, with said hollow end section first, into said housing through a first end thereof in sealed fluid tight relation with said housing and into said annular space and around at least a portion of the length of said first shaft; said second shaft being longitudinally movable along said first shaft through said seal in said first housing end; a piston transversely disposed in said housing in fluid tight relation with the inner wall of said housing and with said second shaft, and rigidly secured to said second shaft and slidable along said first shaft; said first shaft containing at least one groove along at least a fraction of its length extending directly adjacent the entire path of travel of said piston; said groove in the direction toward said first housing end, being initially parallel to the axis of said first shaft and then disposed along a curved path; a pin member fixed to said piston and extending from said piston into said groove; a table member supported on the end of said second shaft, at an acute angle therewith, outside said housing; and conduit means connected with said housing for communicating fluid pressure with the interior of said housing at a point intermediate the point of downwardmost travel of said piston and the second and opposite end of said housing, and at a point intermediate the point of upwardmost travel of said piston and the first end of said housing.

6. Apparatus for receiving packed containers from a packing machine and then delivering same for further handling which comprises an elongated fluid tight housing member; a rod member longitudinally disposed in said housing to form an annulus with the inner housing wall, and secured to a first end of said housing; a hollow shaft in said housing disposed within at least a portion of said annulus around said rod and extending to a point outside said housing through a second and opposite end thereof, in sealed fluid tight relation with said housing and longitudinally movable through the said second housing end while disposed around said rod; a piston in said housing secured to said hollow shaft and in fluid tight contact therewith and with said housing inner wall, and being slidable, in said housing, along said rod; the outside wall of said rod containing at least one groove extending longitudinally adjacent the path of travel of said piston, first along a straight path parallel to the axis of said rod toward said first housing end and then along a spiral path; a pin member extending from said piston into said groove so as to key said piston to said rod, and conduit means associated with said housing for introducing fluid into and withdrawing fluid from that portion of said housing above and below respectively the uppermost point and the lowermost point of travel of said piston therein; and a table member rigidly supported on the end of said hollow shaft at an acute angle therewith, outside said housing, said table member also closing the said outside end of said hollow shaft.

7. A fluid tight tubular housing member; a rod member coaxially disposed within at least a portion of said housing and secured to a first inner end thereof; a hollow piston rod disposed in said housing member concentric with said rod member and extending through a second and opposite end of said housing, sealed in fluid tight relationship with said second end; said hollow piston rod being longitudinally movable along said rod member through the said second housing end; said piston rod being shaped at its end in said housing to form a piston transversely disposed therein in fluid tight relationship with the inner walls of said housing, and slidable along said rod with longitudinal movement of said hollow shaft; said rod containing a pair of grooves disposed along its length about 180° apart and extended so as to be adjacent the entire path of travel of said piston, said grooves in a direction toward said second housing end being parallel initially to the axis of said rod and then disposed along a curved path; a pin member fixed to said piston opposite each of said grooves and extending from said piston into said groove; bearing means in each said groove around each pin therein; and conduit means associated with said housing for introducing fluid into and withdrawing fluid from that portion of said housing above and below respectively the uppermost point and the lowermost point of travel of said piston therein; and a table member rigidly supported on the end of said piston rod at an acute angle therewith, outside said housing, said table member also closing the said outside end of said hollow piston rod.

8. Apparatus of claim 7 wherein said grooves are straight along about ⅘ of the length of said rod.

9. A tamp-type packing machine in combination with a discharge assembly for receiving closed containers from the machine and delivering same for further handling which comprises in combination a platen, and means associated with said platen for supporting a plurality of open-end containers thereon; vibrator means, associated with said platen, adapted to cause said platen to vibrate so as to impart vibration to said containers when supported thereon; a plurality of nipples disposed above said platen and adapted to convey flow of fluent solids toward said platen; means for moving said platen into operative position with said nipples so as to engage each said nipple with an open end of one of said containers supported on said platen, to thereby provide for flow of fluent solids from each said nipple into each said container; means for moving said platen from said operative position; means for actuating said vibrator means to effect vibration of said platen when said platen is in said operative position; a plurality of reciprocating rods each extending into a said nipple and adapted by its reciprocation to force fluent solids through the said nipple when said nipple and said container are in said operative position; means for reciprocating said rods and for maintaining the resulting stroke such that the end of each said rod cannot extend substantially beyond the egress orifice of the nipple; means for moving empty open-end containers onto said platen, when out of said operative position, and for supporting same in an upright position and for then moving said platen into said operative position for engaging said open-end containers with said nipples; means for removing said platen from said operative position, in response to build-up of solids in all of said nipples; means for crimp-closing the open ends of said containers when removed from said platen; means for transferring containers from said platen, in response to its movement from said operative position, to said crimp-closing means, and for then supporting said containers in operative relation with said crimping means to effect crimp-closing of same; means for moving resulting crimped containers from said crimp assembly onto a horizontally disposed table member of a table assembly; said table assembly comprising an upwardly extending shaft adapted to be moved axially; a table rigidly supported on said shaft at an upper end thereof, and disposed at an acute angle with said shaft; and means associated with said shaft for axially guiding same upwardly, first in a static state and then in a state of rotation; means, in response to movement of said platen into said operative position therefor, for axially moving said shaft through said static state and then through said state of rotation to cause said table to rise, turn, and tip and thereby gravitate said containers therefrom; and means, responsive to movement of said platen from said operative position, for moving said shaft downwardly through said state of rotation and static state to place said table in position for receiving containers from said crimp assembly.

10. In a machine for packing open-end containers and for effecting closure of same, the combination comprising means for moving closed containers from said machine onto a table member, of a table assembly, disposed substantially horizontally and in proximity to said machine for receiving said containers; said table assembly comprising an upwardly extending shaft adapted to be moved axially; said table rigidly supported on said shaft at an upper end thereof, and disposed at an acuate angle with said shaft; and means associated with said shaft for axially guiding same in a static state and then in a state of rotation; timing means associated with said table assembly and said machine for synchronizing said axial movement of said shaft upwardly with discharge of closed containers from said machine so as to cause said shaft to axially move first through said static state and then through said state of rotation when said table is initially in said horizontal position and contains closed containers transferred thereto, as described, and to then axially move back through said state of rotation and said static state to place said table in said horizontal position for again receiving packed containers from said machine.

11. A tamp-type packing machine in combination with a discharge assembly for receiving closed containers from the machine and delivering same for further handling which comprises in combination a platen, and means associated with said platen for supporting a plurality of open-end containers thereon; vibrator means, associated with said platen, adapted to cause said platen to vibrate so as to impart vibration to said containers when supported thereon; a plurality of nipples disposed above said platen and adapted to convey flow of fluent solids toward said platen; means for moving said platen into operative position with said nipples so as to engage each said nipple with an open end of one of said containers supported on said platen, to thereby provide for flow of fluent solids from each said nipple into each said container; means for moving said platen from said operative position; means for actuating said vibrator means to effect vibration of said platen when said platen is in said operative position; a plurality of reciprocating rods each extending into a said nipple and adapted by its reciprocation to force fluent solids through the said nipple when said nipple and said container are in said operative position; means for reciprocating said rods and for maintaining the resulting stroke such that the end of each said rod cannot extend substantially beyond the egress orifice of the nipple; means for moving empty open-end containers onto said platen, when out of said operative position, and for supporting same in an upright position and for then moving said platen into said operative position for engaging said open-end containers with said nipples; means for removing said platen from said operative position, in response to build-up of solids in all of said nipples; means for crimp-closing the open ends of said containers when removed from said platen; means for transferring containers from said platen, in response to its movement from said operative position, to said crimp-closing means, and for then supporting said containers in operative relation with said crimping means to effect crimp-closing of same; means for moving resulting crimped containers from said crimp assembly onto a horizontally disposed table member of a table assembly; said table assembly comprising an upwardly extending shaft adapted to be moved axially; said table rigidly supported on said shaft at an upper end thereof, and disposed at an acute angle with said shaft; and means associated with said shaft for axially guiding same upwardly, first in a static state and then in a state of rotation; timing means associated, and synchronized, with said table assembly and said means for transferring containers from said platen to said cirmping means to cause axial movement of said shaft through said static state and then through said state of rotation to cause said table to rise, turn, and tip to thereby gravitate containers therefrom, when said containers are transferred as above described; and timing means associated, and synchronized, with said table assembly and said crimping means to cause axial movement downwardly through said state of rotation and said static state during crimping of said containers to place said table in position for receiving containers from said crimp assembly.

No references cited.